US006563605B1

(12) United States Patent
Shively et al.

(10) Patent No.: US 6,563,605 B1
(45) Date of Patent: May 13, 2003

(54) METHODS OF DETERMINING GRAVURE CYLINDER PARAMETERS

(75) Inventors: J. Thomas Shively, Hinsdale, IL (US); Edward G. Pariser, Oak Park, IL (US)

(73) Assignee: R. R. Donnelley & Sons Company, Chicago, IL (US)

( * ) Notice: Subject to any disclaimer, the term of this patent is extended or adjusted under 35 U.S.C. 154(b) by 0 days.

(21) Appl. No.: 09/027,263

(22) Filed: Feb. 20, 1998

(51) Int. Cl.[7] ............................ B41C 1/02; G06F 19/00

(52) U.S. Cl. ....................... 358/3.29; 358/406; 700/175

(58) Field of Search ................................ 358/3.29, 406; 700/174, 175, 195, 173

(56) References Cited

U.S. PATENT DOCUMENTS 5,229,861 A 7/1993 Nozaka et al.
5,293,426 A * 3/1994 Wouch et al. ............. 358/3.29
5,402,246 A 3/1995 Seitz et al.
5,422,958 A 6/1995 Wouch et al. .............. 382/141
5,424,845 A 6/1995 Holowko et al.
5,438,422 A 8/1995 Holowko et al.
5,440,398 A 8/1995 Holowko et al.
5,519,502 A 5/1996 Beckett
5,555,473 A 9/1996 Seitz et al.
5,569,003 A 10/1996 Goldman et al. ........... 409/132
5,617,217 A 4/1997 Brewer et al.
5,621,533 A 4/1997 Holowko et al.
5,663,801 A 9/1997 Hada et al.
5,663,802 A 9/1997 Beckett et al.
5,663,803 A 9/1997 Beckett et al.
5,675,420 A 10/1997 Beckett et al.

* cited by examiner

*Primary Examiner*—Scott Rogers
(74) *Attorney, Agent, or Firm*—Jenkens & Gilchrist

(57) ABSTRACT

A method of calculating engraving parameters for a gravure cylinder at a desired raster, cell shape and stylus angle given an estimate of the engraving parameters. The method includes inputting a set of initial parameters including an initial raster, an initial cell shape, an initial stylus angle, an initial highlight width, an initial shadow width, an initial channel width and an initial space. The method proceeds by calculating an initial value of a cell volume from the initial parameters. Next, a set of new parameters are inputted including a desired raster, an estimate of a desired highlight width, an estimate of a desired shadow width, an estimate of a desired channel width and an estimate of a desired space. Then, a new value of the cell volume is calculated from the new parameters. Using the volume calculation, the method can be used to: calculate a set of engraving parameters for a gravure cylinder at a new ink cut, calculate the amount of ink solution that a given gravure cylinder will use in making a specified number of impressions, determine the total cost associated with making a specified number of impressions and determine the optimal cell geometry for a gravure cylinder.

3 Claims, 13 Drawing Sheets

Values of dl & dq for a Helio-Klischograph are shown in microns

| Raster | dl (comp) | dq (comp) | dl (elong) | dq (elong) | dl (normal) | dq (normal) | dl (coarse) | dq (coarse) | dl (fine) | dq (fine) |
|---|---|---|---|---|---|---|---|---|---|---|
| 40 | 307.5000 | 410.0000 | 461.2500 | 273.3333 | 353.3333 | 353.3333 | 461.2500 | 410.0000 | 230.6250 | 273.3333 |
| 48 | 255.0000 | 340.0000 | 382.5000 | 226.6666 | 293.3333 | 293.3333 | 382.5000 | 340.0000 | 191.2500 | 226.6666 |
| 54 | 225.0000 | 300.0000 | 337.5000 | 200.0000 | 263.3333 | 263.3333 | 337.50000 | 300.0000 | 168.7500 | 200.0000 |
| 56 | 217.5000 | 290.0000 | 326.2500 | 193.3333 | 253.3333 | 253.3333 | 326.2500 | 290.0000 | 163.1250 | 193.3333 |
| 58 | 210.0000 | 280.0000 | 315.0000 | 186.6666 | 243.3333 | 243.3333 | 315.0000 | 280.0000 | 157.5000 | 186.6666 |
| 60 | 202.5000 | 270.0000 | 303.7500 | 180.0000 | 236.6666 | 236.6666 | 303.7500 | 270.0000 | 151.8750 | 180.0000 |
| 63 | 195.0000 | 260.0000 | 292.5000 | 173.3333 | 220.0000 | 220.0000 | 292.5000 | 260.0000 | 146.2500 | 173.3333 |
| 64 | 195.0000 | 260.0000 | 292.5000 | 173.3333 | 220.0000 | 220.0000 | 292.5000 | 260.0000 | 146.2500 | 173.3333 |
| 65 | 187.5000 | 250.0000 | 281.2500 | 166.6666 | 216.6666 | 216.6666 | 281.2500 | 250.0000 | 140.6250 | 166.6666 |
| 68 | 180.0000 | 240.0000 | 270.0000 | 160.0000 | 206.6666 | 206.6666 | 270.0000 | 240.0000 | 135.0000 | 160.0000 |
| 70 | 172.5000 | 230.0000 | 258.7500 | 153.3333 | 203.3333 | 203.3333 | 258.7500 | 230.0000 | 129.3750 | 153.3333 |
| 75 | 165.0000 | 220.0000 | 247.5000 | 146.6666 | 190.0000 | 190.0000 | 247.5000 | 220.0000 | 123.7500 | 146.6666 |
| 80 | 150.0000 | 200.0000 | 225.0000 | 133.3333 | 176.6666 | 176.6666 | 225.0000 | 200.0000 | 112.5000 | 133.3333 |
| 85 | 142.5000 | 190.0000 | 213.7500 | 126.6666 | 166.6666 | 166.6666 | 213.7500 | 190.0000 | 106.8750 | 126.6666 |
| 90 | 135.0000 | 180.0000 | 202.5000 | 120.0000 | 156.6666 | 156.6666 | 202.5000 | 180.0000 | 101.2500 | 120.0000 |
| 95 | 127.5000 | 170.0000 | 191.2500 | 113.3333 | 150.0000 | 150.0000 | 191.2500 | 170.0000 | 95.6250 | 113.3333 |
| 100 | 120.0000 | 160.0000 | 180.0000 | 106.6666 | 140.0000 | 140.0000 | 180.0000 | 160.0000 | 90.0000 | 106.6666 |

FIG. 2

METHODS OF DETERMINING GRAVURE CYLINDER PARAMETERS

FIELD OF THE INVENTION

The present invention relates generally to the field of gravure printing. More particularly, it concerns methods for determining various parameters of gravure cylinders including the cell volume, the cell width, cell wall width, the channel width or the space, the cell surface area, etc. to optimize the production of high quality engraved gravure cylinders.

BACKGROUND OF THE INVENTION

Gravure printing is done on presses that use cylinders that have text and images engraved on their surfaces. Consequently, the printing plates are engraved to create cells or depressions in the areas containing the text and images. To print using these cylinders, the cells are filled with ink. A doctor blade is then used to remove excess ink from the nonprinting areas or cells walls. The cells are engraved into a gravure cylinder by an engraving head of an engraver or engraving machine such as a Helio-Klischograph manufactured by Dr. Ing. Rudolf Hell GmbH. The engraving head includes a diamond stylus cutting tool.

Prior to engraving a gravure cylinder, each engraving head of the engraver is calibrated. Calibration is performed by engraving selected test cuts on the gravure cylinder. Each test cut is composed of a collection of preferably identical cells. Typically, at least two test cuts are made before an image is engraved onto the gravure cylinder. Normally, one test cut of highlight cells is engraved at the light end of the image which corresponds to a stylus digital value (dv), for example, of 161. A second text cut of shadow cells is engraved at the dark end, or in the shadows of the image, which corresponds, for example, to a dv of 1. Tests cuts are sometimes made in the midtone areas which normally correspond to a dv of 81.

Finally, a tone reproduction curve, in the form of an 8-bit (256 level) look-up table, maps the image data to the engrave data. This table allows for fine tone-reproduction adjustments throughout the entire printing range for each printing color.

The process of calibration requires measurement of certain cylinder parameters. An operator usually measures the morphological parameters of a single cell out of the test cut with an optical microscope. This general procedure is performed for a highlight cell and a shadow cell in the respective test cuts for each engraving head. The operator usually knows from experience a target highlight cell width (wh), a target shadow cell width (ws), and a third parameter. The third parameter depends upon the type of shadow cells being engraved. If the shadow cells are connected, i.e., have connecting channels between the cells in the circumferential direction, the third parameter is channel width (wc). If the cells are discrete, i.e., have spaces between the cells in the circumferential direction, the third parameter is the space (S). The space S is related to the length of a cell by the equation:

$$dl=S+length$$

where dl is the stylus period, also known as the circumferential spacing of the cells;

S is the space; and length is the length of a cell in the circumferential direction.

Another parameter that defines a gravure cylinder is the maximum cell width (dq). Usually, cells are engraved in an offset fashion in the axial direction. In other words, a first circumferential line of cells is engraved around the cylinder. A second circumferential line of cells is then engraved around the cylinder, but the second line of cells is offset from the first line of cells such that, in the case of cells connected by channels, the horizontal center of the cells in the first line are at the channels of the second line, as illustrated in FIG. 1. Therefore, the maximum cell width (dq) is the measurement from the middle of the channel of the first line of cells to the middle of the channel of the third line of cells. The second line of cells begins a distance dq/2 away from the first line of cells, but that beginning point is offset by dl/2 in the circumferential direction. The raster and angle (or cell shape) uniquely define dl and dq for a given cylinder. For example, a 70 raster with a compressed cell shape has a dl=172.5 microns and a dq −230 microns. A table of raster values and their corresponding dl and dq values for various cell shapes is provided in FIG. 2. These values are unique to the Hello-Klischograph engraving machine. There are a variety of cell shapes including compressed, normal, elongated, coarse, and fine. These are illustrated in FIG. 3. Another gravure cylinder parameter is the cell wall width. The cell wall width is the measurement of the axial spacing between cells. In the case of cells connected by channels, the cell wall width 18 is constant, as illustrated in FIG. 1. In the case of discrete cells, the cell wall width 58 varies, as illustrated in FIG. 4. The cell walls is required in order to support the doctor blade that removes the excess ink from the cylinder. Another parameter that affects cell size is the stylus angle; however, this angle is usually not changed.

Target values for cylinder engraving parameters are fine tuned by trial and error. These adjustments are motivated by observations made during press runs. For example, a press crew might notice that flesh tones are tending to look too red. The engraving department might try to fix this by making a small reduction in the target width of the cells on the magenta cylinder. The degree of adjustment is determined by trail and error, but experienced engravers will probably be able to make such an adjustment with relatively few trails. Conversely, a customer might complain that a printed product looks grainy. The engraver may choose to fix this by engraving with a finer screen, i.e., engraving at a higher raster. This move to a higher raster, will require significant changes to all the engraving parameters in the cylinders for every color. The correct adjustments to make in this case are outside the expertise of most cylinder engraving departments because raster changes are a much less frequent occurrence. These significant engraving parameter changes can lead to significant and costly trial end error procedures. Thus, there is a need for an improved method of determining the change in cell parameters when significant cylinder adjustments are necessary, such as a change in raster, cell shape and/or stylus angle.

SUMMARY OF THE INVENTION

It is an object of the present invention to provide a method of determining engraving parameters for a gravure cylinder at a desired raster, cell shape and stylus angle given an estimate of the engraving parameters.

It is another object of the present invention to provide a method of determining a set of engraving parameters for a gravure cylinder at a new ink cut.

It is a further object of the present invention to provide a method of determining the amount of ink solution that a given gravure cylinder will use in making a specified number of impressions.

It is another object of the present invention to provide a method of determining, prior to printing, the total cost associated with making a specified number of impressions.

It is still another object of the present invention to provide a method of determining the optimal cell geometry for a gravure cylinder.

These and other objects of the invention are provided by a method of calculating engraving parameters for a gravure cylinder at a desired raster, cell shape and stylus angle given an estimate of the engraving parameters. The method includes inputting a set of initial parameters including an initial raster, an initial cell shape, an initial stylus angle, an initial highlight width, an initial shadow width, an initial channel width and an initial space. The method proceeds by calculating an initial value of a cell volume from the initial parameters. Next, a set of new parameters are inputted including a desired raster, an estimate of a desired highlight width, an estimate of a desired shadow width, an estimate of a desired channel width and an estimate of a desired space. Then, a new value of the cell volume is calculated from the new parameters. Using the volume calculation, the method can be used to: calculate a set of engraving parameters for a gravure cylinder at a new ink cut, calculate the amount of ink solution that a given gravure cylinder will use in making a specified number of impressions, determine the total cost associated with making a specified number of impressions and determine the optimal cell geometry for a gravure cylinder.

BRIEF DESCRIPTION OF THE DRAWINGS

Other objects and advantages of the invention will become apparent upon reading the following detailed description and upon reference to the accompanying drawings, in which:

FIG. 2 is a table of gravure cylinder parameters;

DESCRIPTION OF ILLUSTRATIVE EMBODIMENTS

Figure 1:
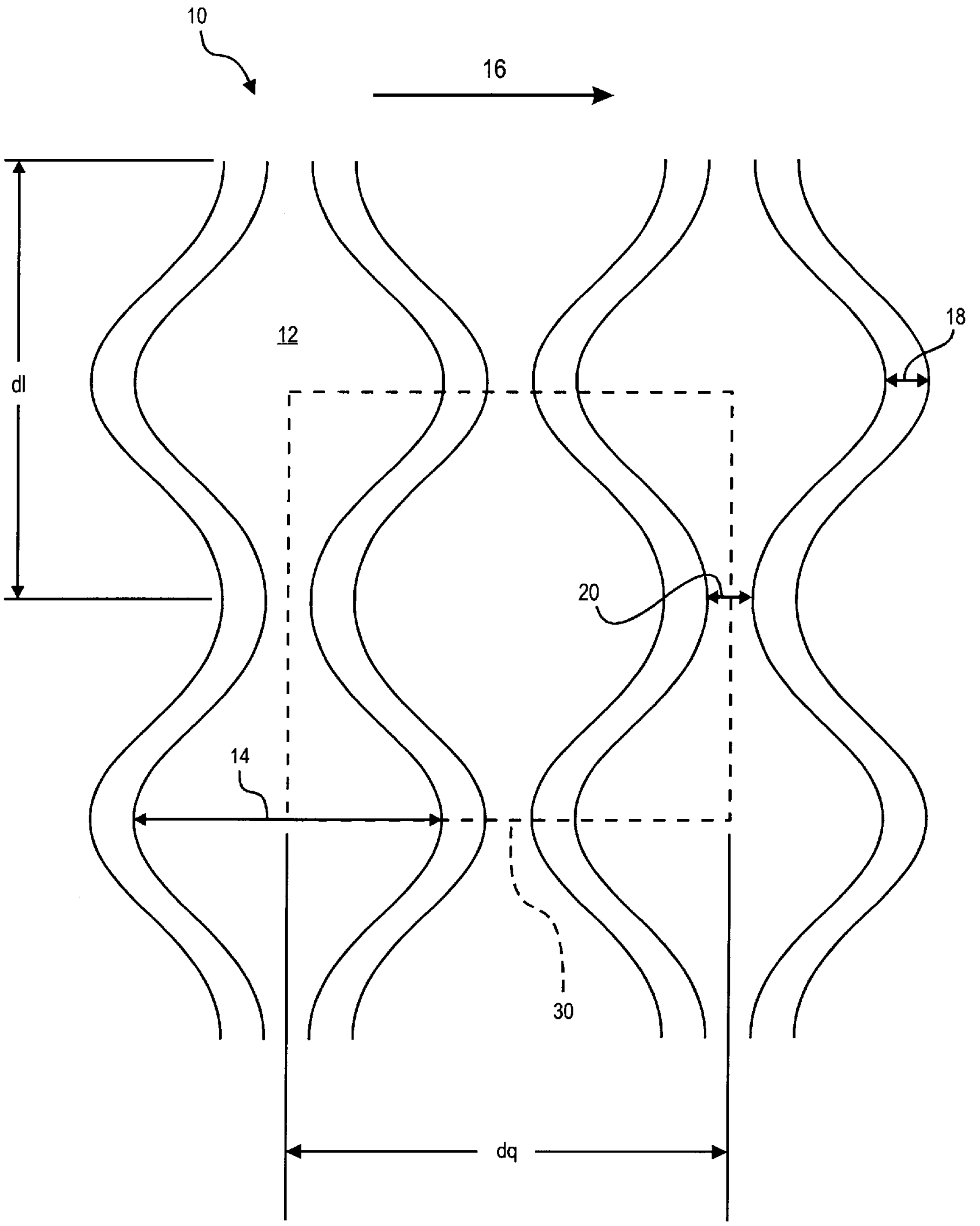
FIG. 1 is a top close-up view of a gravure cylinder showing cells connected by a channel.
Figure 3:
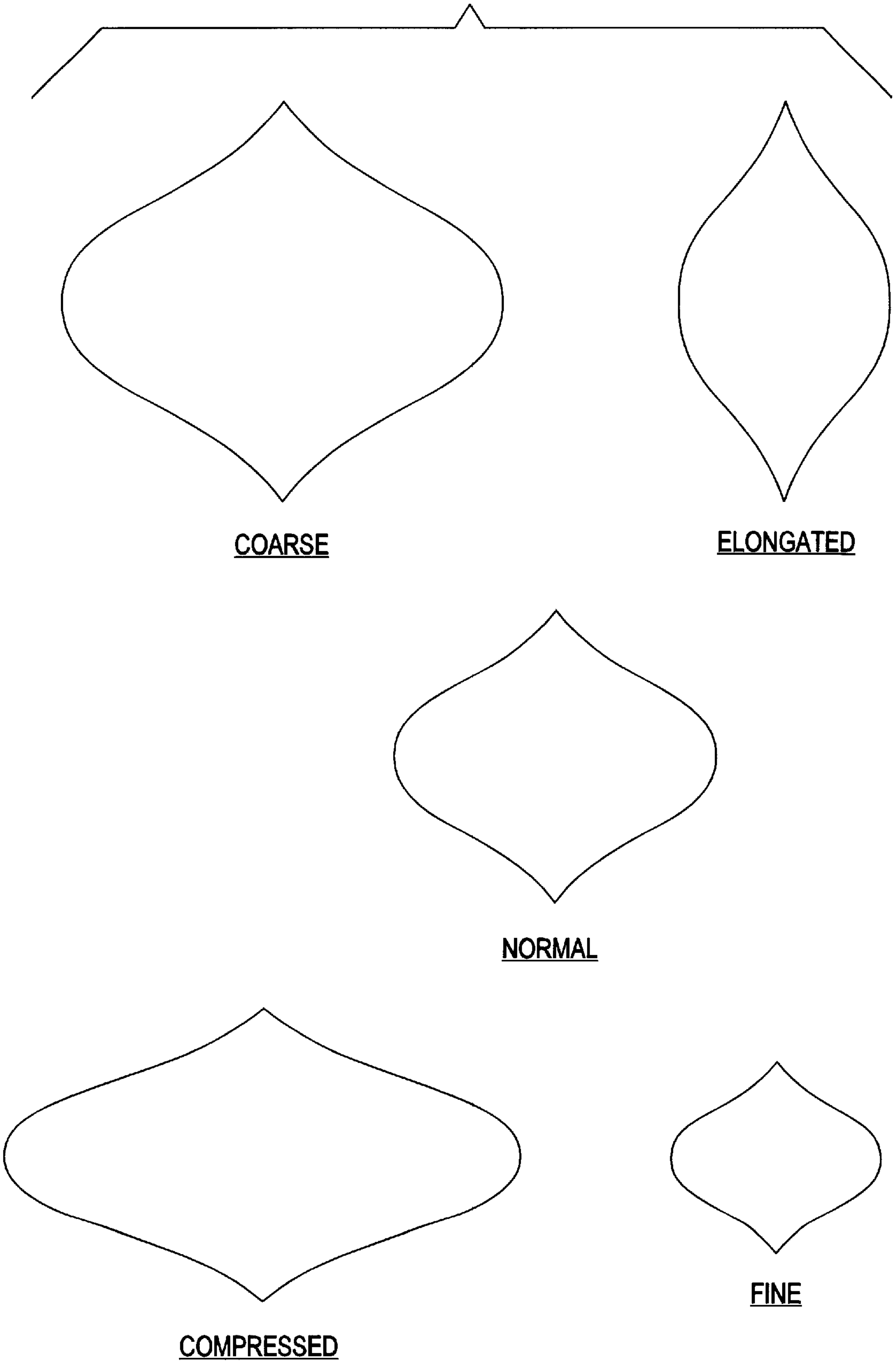
FIG. 3 is a top close-up view of a plurality of different shaped discrete cells.

Gravure printing requires engraved cylinders to produce printed images. An engraving machine engraves the text and images to be printed on the surface of the cylinders. The printing cylinders are engraved with cells that are filled with ink. The engraving machines include a diamond stylus that is controlled by a voltage that drives the stylus into the cylinder thus forming a cell. The digital value (dv) of a cell is proportional to the voltage applied to the stylus. The stylus voltage is proportional to the penetration of the stylus into the cylinder. Typically digital values are stored as one byte (8 bits) of information, thus the dv's range from 0 to 255. A dv of 1 corresponds to a shadow cell while a dv of 255 corresponds to a highlight cell. However, generally the full range of digital values is not used, rather a dv of 180 or greater typically corresponds to a stylus that is not in contact with the cylinder. After a specific dv is entered, the engraver converts the dv to an output voltage that drives the diamond stylus into a cylinder 10, thus producing a cell. In the case where connected cells are formed, a stylus, reciprocating in a sinusoidal fashion, cuts a cylinder 10 to form connected cells 12 having an hour glass shape, as illustrated in FIG. 1. Each of the connected cells 12 have a cell width 14, a cell surface area, and a cell volume. The plurality of connected cells 12 define therebetween a cell wall width 18, and a channel width 20, as illustrate in FIG. 1. The cell wall width 18 is measured between cells 12 in the axial direction 16. The channel width 20 is measured at the smallest point of the hour glass.

Figure 4:
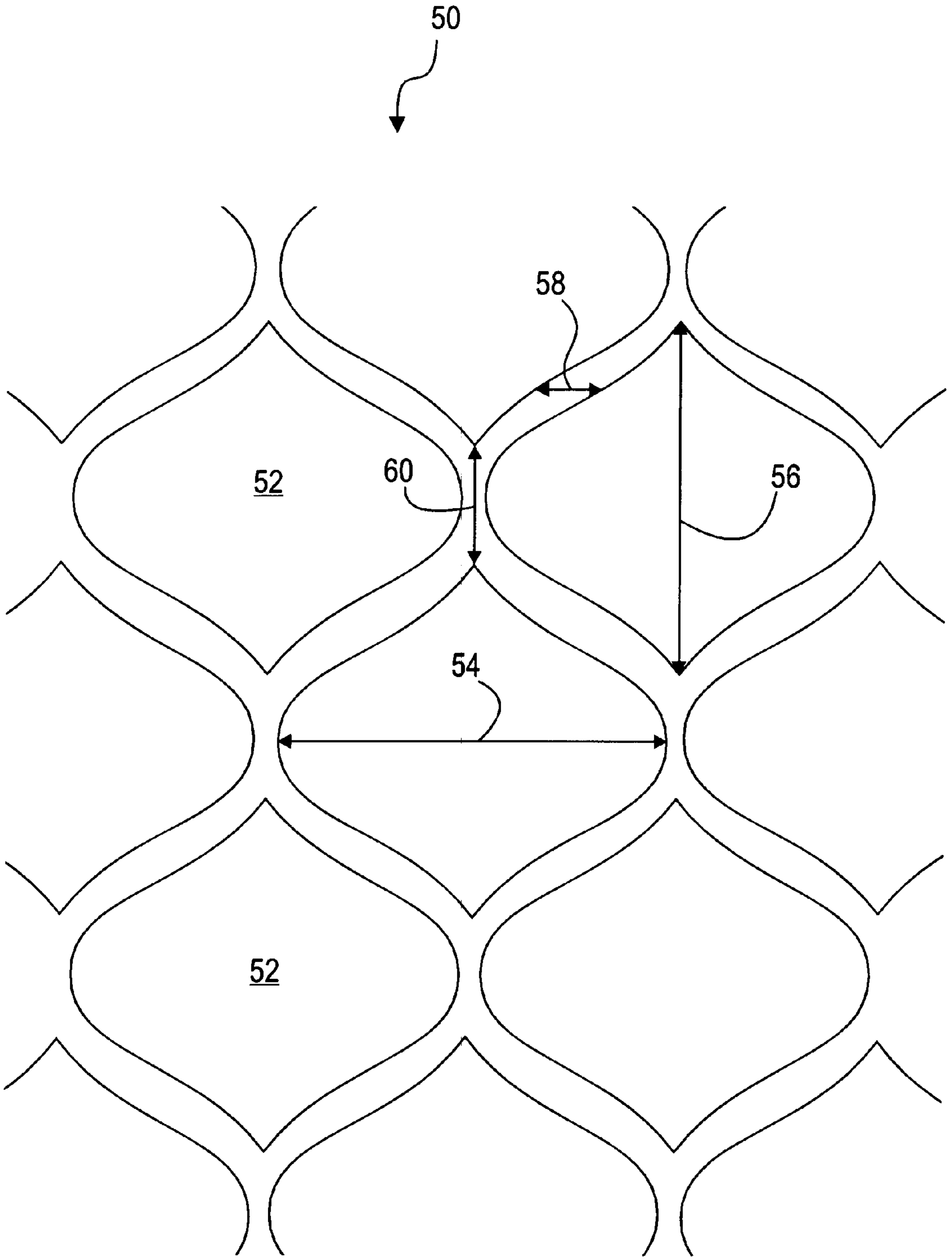
FIG. 4 is a top close-up view of a gravure cylinder showing discrete cells.

Similarly, in the case where discrete cells are formed, the output voltage drives a vibrating diamond stylus that cuts into a cylinder 50 to form discrete cells 52 having a diamond shape, as illustrated in FIG. 4. Each of the discrete cells 52 have a cell width 54, a cell length 56, a cell surface area, and a cell volume. The plurality of discrete cells 52 define therebetween a cell wall width 58, and a space 60, as illustrated in FIG. 4.

The parameters required to set up a gravure cylinder engraver include: the shadow cell width (ws), the highlight cell width (wh), (the channel width (wc) or the space (S)), the digital value of a shadow cell (dvs), and the digital value of a highlight cell (dvh). An experienced operator knows the value of these parameters at a given raster, cell shape and stylus angle from experience through trial and error.

In one embodiment of this invention, there is provided a method of calculating a set of a engraving parameters for a gravure cylinder at a desired raster, cell shape and stylus angle given the highlight and shadow parameters at the current raster, cell shape and stylus angle and an estimate of the new or desired parameters. The operator must estimate the following desired parameters: the highlight cell width (wh), the shadow cell width (ws) and (the space (S) or the channel width(wc)), depending on whether the shadow cells are discrete or connected, respectively. The method then determines whether the given parameters at the new raster, shape and stylus angle yield the initial cell volume per unit area. If they do, the parameters are the parameters required to cut a cylinder at the new raster, cell shape and stylus angle. Otherwise, the operator inputs another estimate of the desired parameters and the method recalculates the cell volume per unit area so it can be determined whether the new estimate is accurate. This process is repeated until the desired parameters at the new raster, cell shape and stylus angle yield the initial cell volume per unit area. From the estimated parameters, other parameters can be determined at the new raster, cell shape, and stylus angle including: the cell wall width, the cell surface area, and the cell volume at the desired raster, shape or stylus angle. Thus, new engraving parameters at a desired raster, cell shape or stylus angle can be determined more accurately, quickly and inexpensively.

The present method generally proceeds by inputting initial parameters into three equations with three unknowns.

Then, the three equations are solved for the three unknowns. The initial value of other cylinder parameters is calculated from the solution of the three unknowns. As used herein, "solve" is defined as computing the result of an equation or formula.

Figure 5:
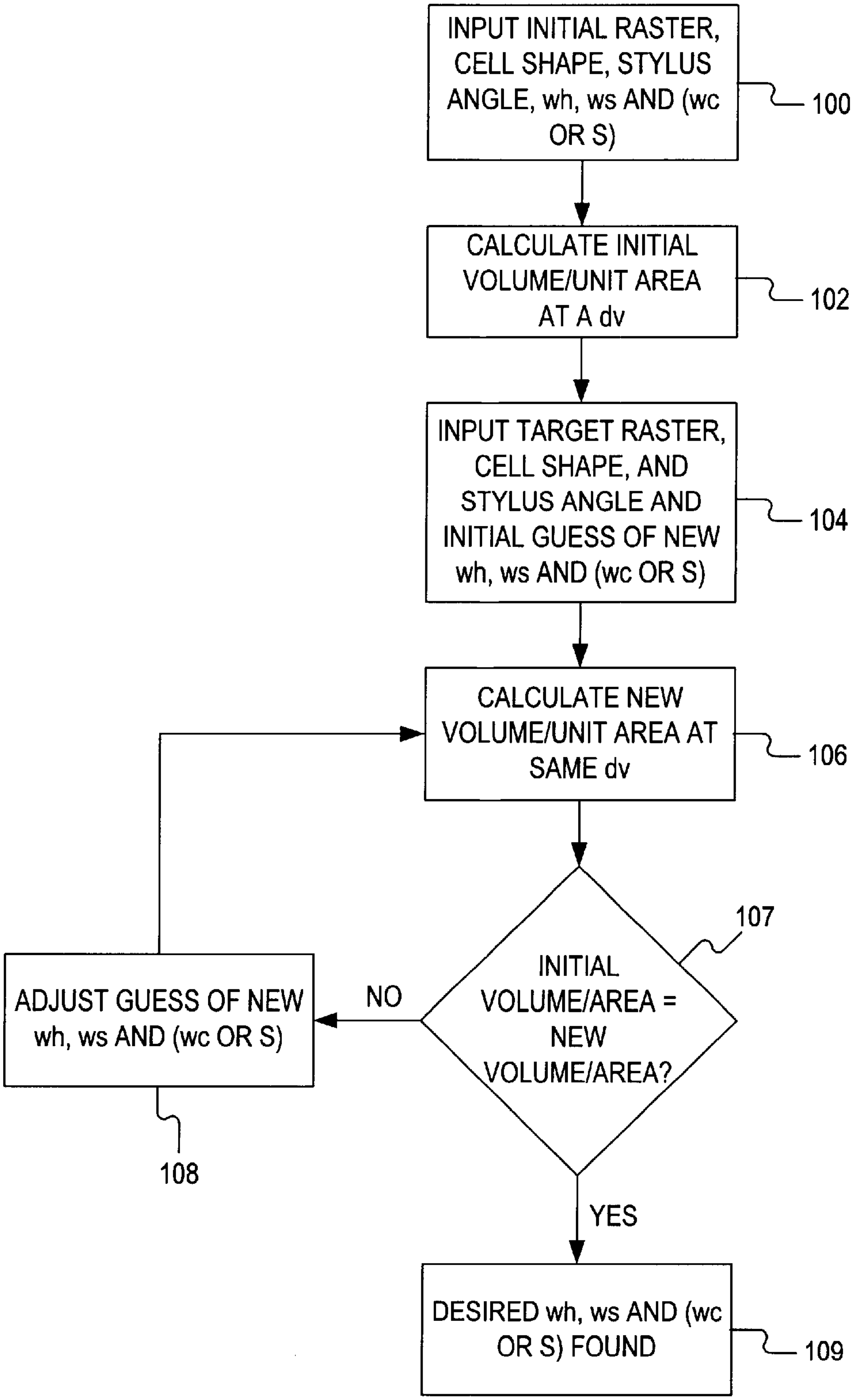
FIG. 5 is a flow diagram of the steps taken in accordance with one method of the present invention.

One embodiment of the present method is set forth in the flow diagram illustrated in FIG. 5. The method of the present embodiment proceeds by first inputting the initial raster, cell shape, stylus angle, highlight cell width (wh), shadow cell width (ws) and (the space (S) or the channel width(wc)), depending on whether the shadow cells are discrete or connected, respectively. This is depicted in step 100 of FIG. 5. A zero inputted for S indicates that the shadow cells are connected and hence have no space. Similarly, a zero inputted for wc indicates that the shadow cells are discrete and hence have no channel width. Next, the initial cell volume per unit area is calculated at one or more digital values, e.g., at the highlight digital value (dvh), the shadow digital value (dvs) and/or the midtone digital value (dvm). This is depicted in step 102 of FIG. 5. The raster, cell shape and stylus angle are then entered along with an initial guess of the new wh, the new ws and (the new S or wc). This is depicted in step 104 of FIG. 5. The new volume per unit area is then calculated at the same one or more digital values as above, e.g., at the same dvh, the same dvs and/or the same dvm. This is depicted in step 106 of FIG. 5. If the initial volume per unit area equals the new volume per unit area then the initial guess of the new wh, the new ws and (the new S or wc) was accurate and can be used to engrave cylinders at the new raster, cell shape and stylus angle. This is depicted in steps 107 and 109 of FIG. 5. Otherwise, the operator adjusts the guess of the new wh, the new ws and (the new S or wc) and the new volume per unit area is recalculated and compared to the initial volume per unit area. This is depicted in steps 108, 106 and 107 of FIG. 5. If the two volumes match, the desired parameters were found. This is depicted in steps 107 and 109 of FIG. 5. Otherwise the process of steps 107, 108 and 106 is repeated until the desired parameters are found.

The above method yields the initial values of the cell volume per unit area, the cell surface area and/or the cell wall width and the new values of the cell width, (wc or S), the cell volume per unit area, the cell surface area and/or the cell wall width.

The maximum cell area is used to compute the cell volume per unit area. The maximum cell area is best explained with reference to FIG. 1. Twice the maximum cell area of a cell is shown as the enclosed area 30. This area represents dl·dq. In order to find the maximum cell area for one cell, the enclosed area is divided by two because the enclosed area contains one whole cell and a quarter of four other cells.

With the given parameters, the equation to calculate the cell volume of a cell for any digital value (dv) is as follows:

$$\text{cell volume}=2\cdot\cot(\text{alpha}/2)\cdot((A^2+2\cdot C^2+4\cdot B\cdot C\cdot dv+2\cdot B^2\cdot dv^2)\cdot \text{xend}/2+A\cdot dl(C+B\cdot dv)\cdot\sin(2\cdot n\cdot \text{xend}/dl)/n+A^2\cdot dl\cdot\sin(4\cdot n\cdot \text{xcnd}/dl)/(8\cdot n))$$

where

A=(·wc+ws)/(2(1+cos(S·n/dl)));

B=(wh−ws)/(2(dvh−dvs));

C=(·(dvs(wh−ws)/(dvh−dvs))+(wc+ws·cos(S·n/dl))/)1+cos (S·n/dl)))/2;

wh is the highlight cell width;

ws is the shadow cell width;

wc is the channel width between connected shadow cells;

S is the space between discrete shadow cells;

dl is determined from the initial raster value and the initial cell shape value;

dvh is the digital value used to engrave the highlight cells;

dvs is the digital value used to engrave shadow cells;

dv is any digital value. In one embodiment, dv would be set to:

dvh if a highlight cell volume is being calculated, dvs if a shadow cell volume is being calculated, or dvm if a midtone cell volume is being calculated;

alpha=(the stylus angle in degrees)·n/180; and xend is either dl/2 if the shadow cell has a channel or dl·arccos((—C—B·dv)/A/(2n) if the shadow cell does not have a channel.

With the given parameters, the specific equation to calculate the cell wall width is as follows:

cell wall width=dq/2−(−(dvs(wh−ws)/(dvh−dvs))+(wc+ws·cos(S·n/dl))/(1+cos(S·n/dl)))

where dv, wh, ws, wc, S, dl, dvh, and dvs are the same as they were for the cell volume calculation above.

With the given parameters, the equation to calculate the cell surface area of cell is as follows:

cell surface area =4·((C+B·dv)·xend+A·dl·sin(2·n·xend/dl)/(2·n))

where A, B, C, dv, dl and xend are the same as they for the cell volume calculation above.

Given an estimate of wh, ws and (S or wc) at the desired raster, cell shape and stylus angle, the above equations can be used to determine various engraving parameters at a new raster, cell shape or stylus angle. Thus, re-calibration at the new raster, shape or stylus angle is not required. The above equations yield the new cell volume, the new cell wall width and the new cell surface area at the desired raster, cell shape or stylus angle given wh, ws and (S or wc). In addition, by use of several other equations, several more parameters can be calculated. Specifically, a value of the cell width at any dv can be calculated for any raster, shape and stylus angle by the following formula:

cell width=2·(A+B·dv+C)

where A, B, C, dv, wc, ws, wh, S, dl, dvs, and dvh are the same as they were for the cell volume calculation above.

The case of connected cells, the value of the channel width for any dv at a given raster, shape and stylus angle can be calculated by the following formula:

channel width=2·(·A+B·dv+C)

where A, B, C and dv are the same as they were for the cell volume calculation above.

Alternatively, where discrete cells are formed, the size of the space at a given raster, shape and stylus angle can be calculated by the following formula:

space=dl(1−arccos((−C−B·dv)/A)/(n))

where A, B, C, dv and dl are the same as they were for the cell volume calculation above.

By using these formulas, the parameters of a new cylinder at the desired raster, shape or stylus angle can be determined without the necessity of performing test cuts or test prints. This invention therefore saves operator time and the expense of performing test cuts and/or test prints.

In another embodiment of this invention, the volume calculation is used to determine from an initial ink cut, the set of engraving parameters at a new ink cut. The ink cut is the percentage of varnish to ink. For example, an ink cut of 25% corresponds to 1 part varnish and 3 parts ink. ((1 part varnish)/(1 part varnish+3 parts ink)=0.25). If the new ink cut is 20%, then the total new ink per cell is 0.80. By equating the initial ink cut multiplied by the initial cell volume with the target ink cut multiplied by the target cell volume, the target cell volume can be found. The new cell engraving parameters can be derived from the target cell volume. Specifically, an iterative routine is used to search for the new cylinder parameters at the target ink cut, in which: the shadow cell width is varied until the calculated target cell volume is reached; or the shadow cell width and length are varied until the calculated target cell volume is reached, keeping the shadow cell width to length ratio proportionate; or the shadow cell width and channel width are varied until the calculated target cell volume is reached, keeping the shadow cell width to channel width ratio proportionate.

Figure 6:
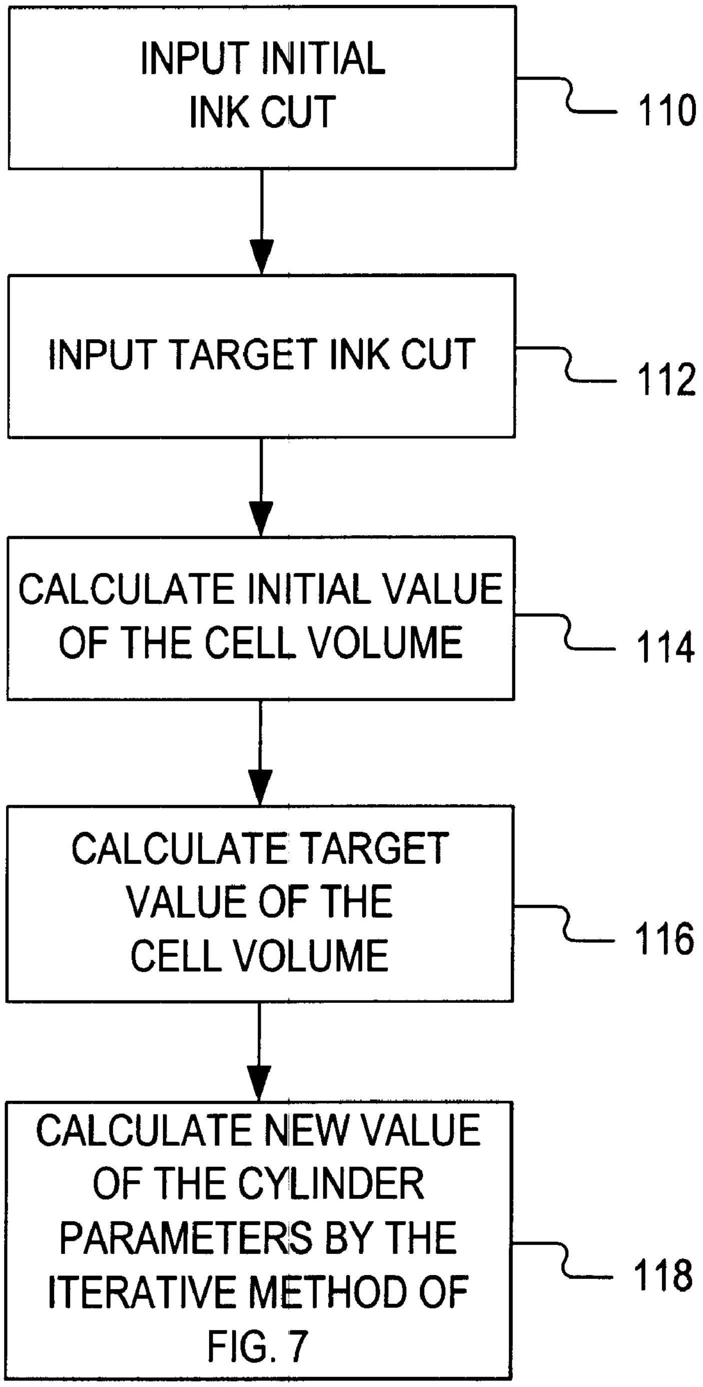
FIG. 6 is a flow diagram of the steps taken in accordance with another method of the present invention.

One method of determining the set of engraving parameters is set forth in the flow diagram illustrated in FIG. 6. The method includes inputting the initial ink cut. This is depicted in step 110 of FIG. 6. Next, the target ink cut is inputted. This is depicted in step 112 of FIG. 6. The method proceeds by calculating the initial value of the cell volume. This is depicted in step 114 of FIG. 6. Next, the target value of the cell volume is calculated. This is depicted in step 116 of FIG. 6. From the target value of the cell volume, the new value of the cylinder parameters are then calculated by the iterative method of FIG. 7. This is depicted in step 118 of FIG. 6.

Figure 7:
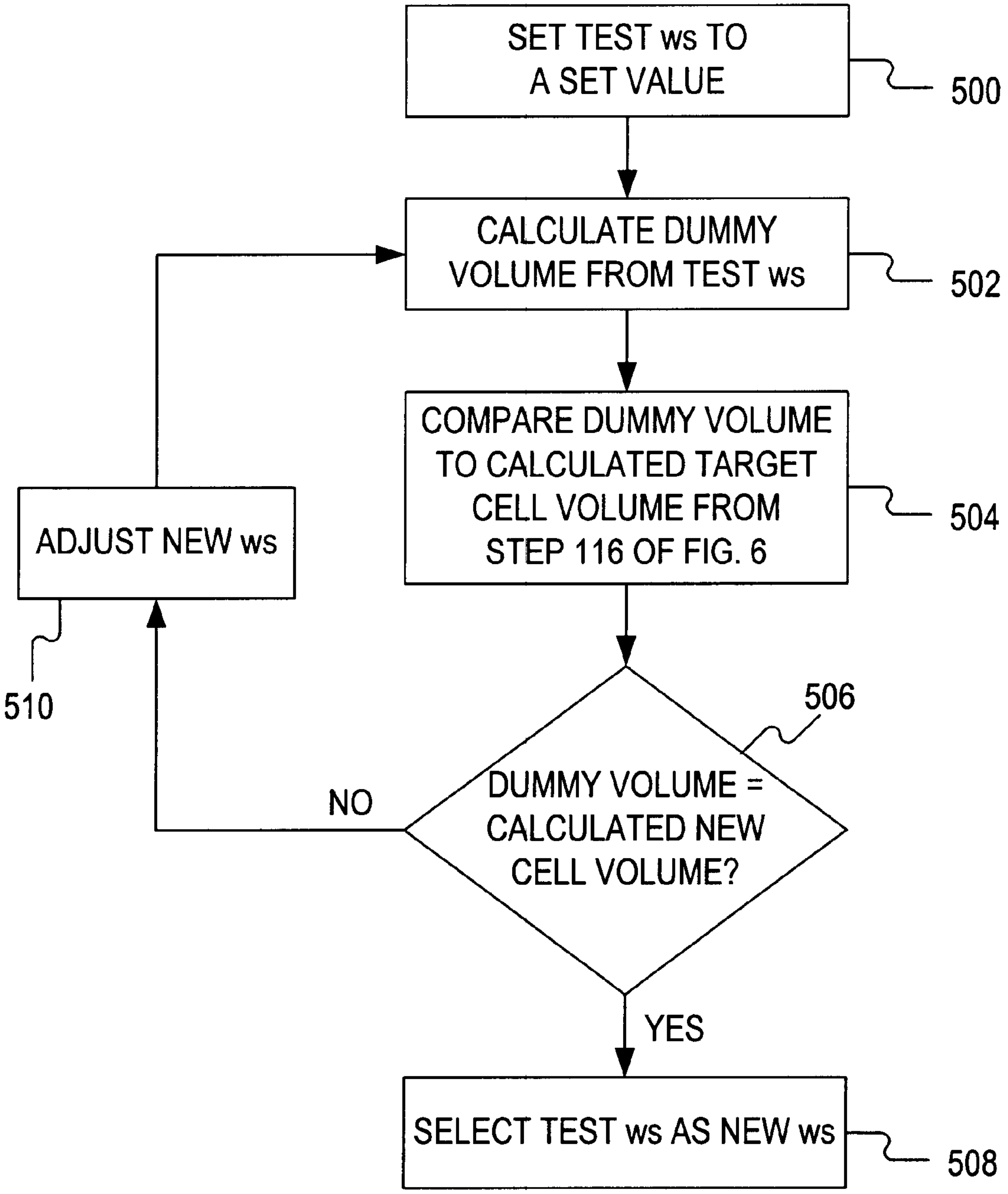
FIG. 7 is a flow diagram of the steps taken in accordance with a further method of the present invention.

The iterative method by which the new value of the cylinder parameters are calculated is illustrated in FIG. 7. The method begins by setting a test shadow cell width (ws) to a set value. This is depicted in step 500 of FIG. 7. Then, a dummy volume is calculated from the test shadow cell width. This is depicted in step 502 of FIG. 7. The dummy volume is then compared to the calculated target cell volume from step 116 of FIG. 6. This is depicted in step 504 of FIG. 7. The test shadow cell width is then selected as the target shadow cell width if the dummy volume is equal to the calculated target cell volume. This is depicted in steps 506 and 508 of FIG. 7. Otherwise, the target shadow cell width is adjusted and steps 510, 502–506 are repeated until the dummy volume equals the calculated new cell volume. This is depicted in steps 506, 510, 502–508 of FIG. 7.

The following equation is used to determine the target value of the cylinder parameters:

$$\text{cell volume}=2\cdot\cot(\text{alpha}/2)\cdot((A^2+2\cdot C^2+4\cdot B\cdot C\cdot dv+2\cdot B^2\cdot dv^2)\cdot xend/2+A\cdot dl(C+B\cdot dv)\cdot\sin(2\cdot n\cdot xend/dl)/n+A^2\cdot dl\cdot\sin(4\cdot n\cdot xend/dl)/(8\cdot n))$$

where A, B, C, dv, dl, alpha, and xend arc the same as they were above for the cell volume calculation above.

From the initial and target ink cut values and the initial engraving parameters, the volume calculation can be used to iteratively determine a new engraving tone reproduction curve, in the form of an 8-bit (256 level) look-up table, that produces the same 256 tones at the target ink cut.

Figure 8:
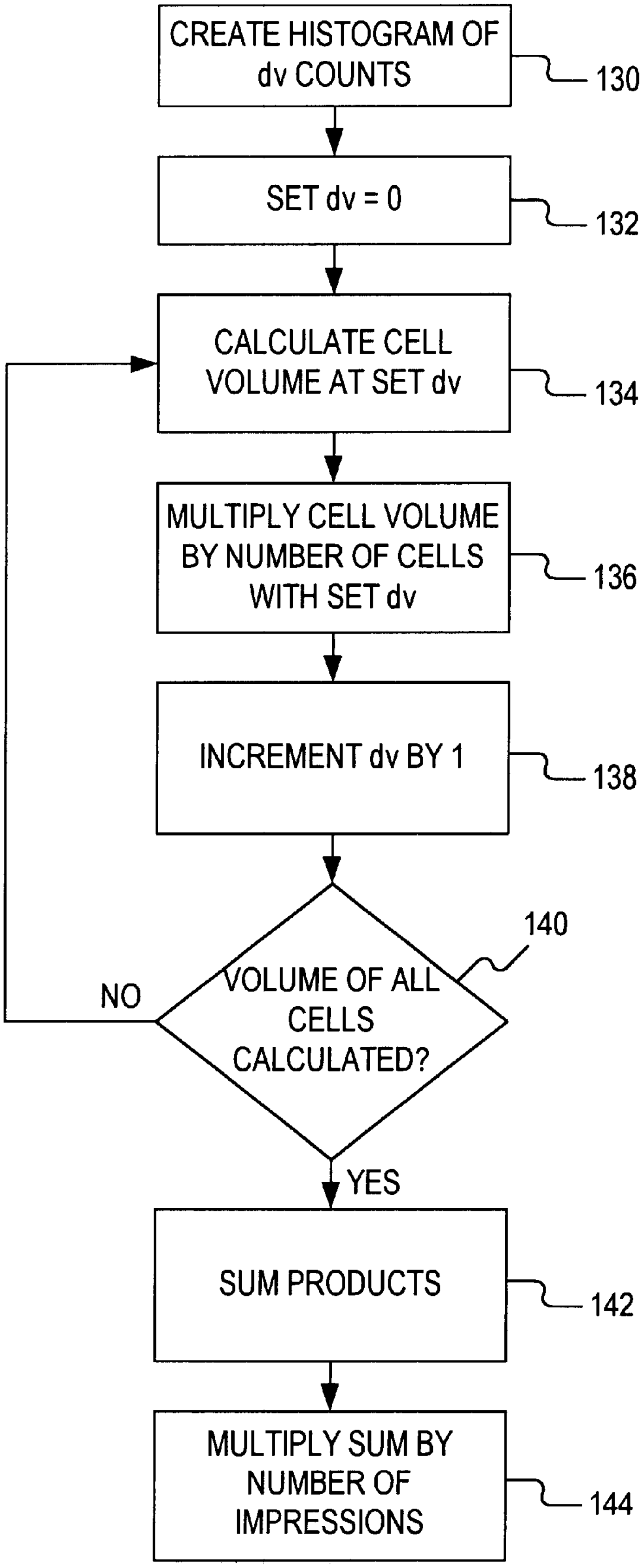
FIG. 8 is a flow diagram of the steps taken in accordance with another method of the present invention.

In yet another embodiment of this invention, the cell volume calculation is used to determine, prior to printing, the amount of ink that a project will consume. The method of determining the amount of ink is set forth in the flow diagram illustrated in FIG. 8. The ink consumption calculation starts by creating a histogram of digital value, dv, counts, i.e., the count of the number of cells at each dv. This is depicted in step 130 of FIG. 8. Then, the value of dv is set to zero. This is depicted in step 132 of FIG. 8. The method proceeds by calculating the cell volume for one cell at the set dv. This is depicted in step 134 of FIG. 8. The cell volume is then multiplied by the number of the cells with the set dv. This is depicted in step 136 of FIG. 8. The dv is than incremented by one. This is depicted in step 138 of FIG. 8. The above steps are repeated until the volume of all of the cells have been calculated. This is depicted instep 140 of FIG. 8. Then, the products from the multiplication step are summed. This is depicted instep 142 of FIG. 8. That sum is multiplied by the specified number of impressions the job will require. This is depicted in step 144 of FIG. 8. The number of impressions is the number of copies of the printed image that are produced. The result of the above steps gives a number that is proportional to the amount of ink solution that the job will consume. The ink solution comprises ink, varnish, solvent and any other additives used in the ink bath. The ink consumption calculation can be easily performed by use of the following equation:

$$\text{ink solution used} = K*\left[\sum_{\text{count of } dv=0}^{255}(\text{count of dv})*(\text{cell volume at that dv})\right]*[\text{number of impressions}]$$

where K is a proportionality constant fixed from experience that takes into account any error attributable to effects such as incomplete transfer of ink out of the cells.

Figure 9:
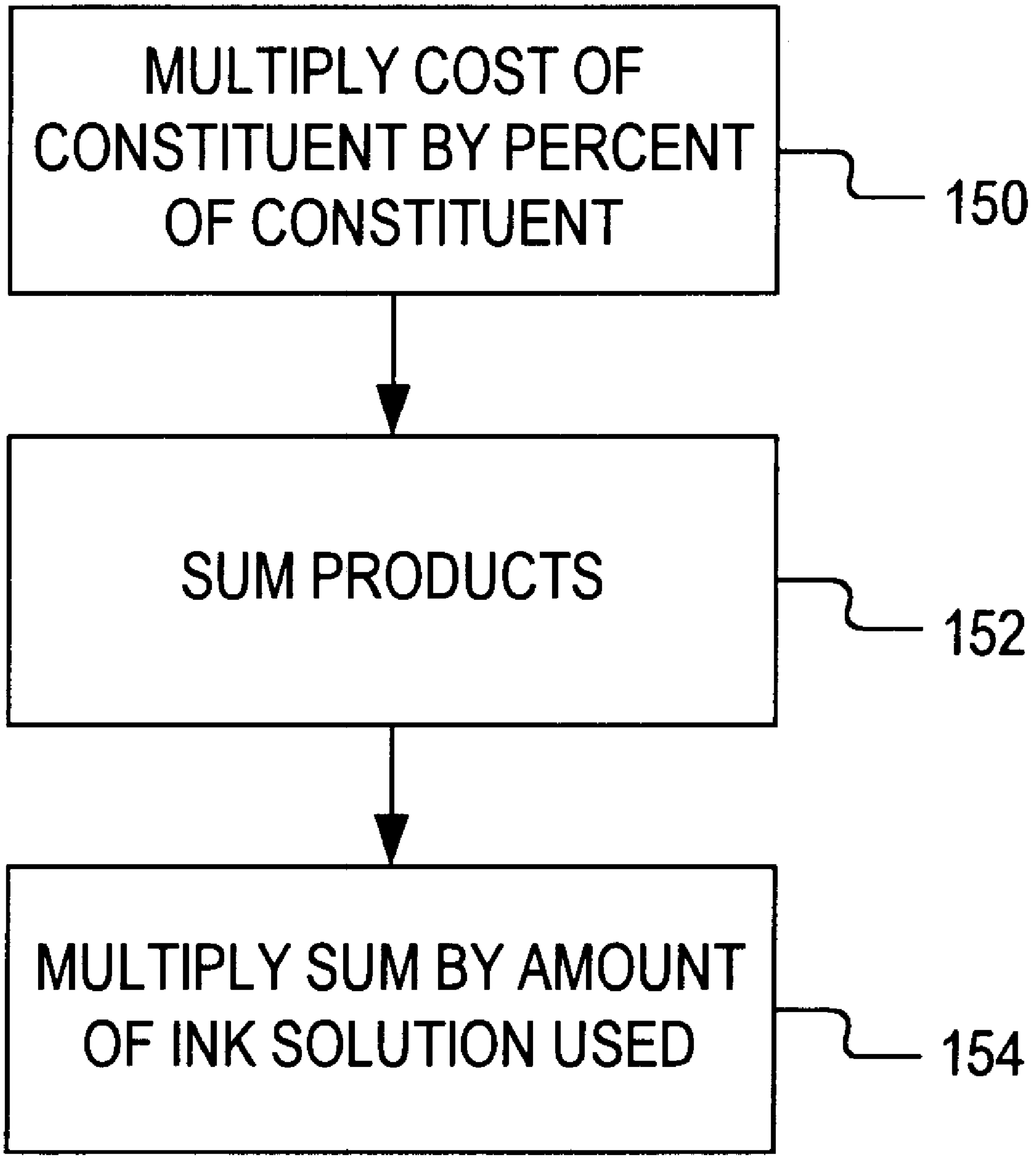
FIG. 9 is a flow diagram of the steps taken in accordance with still another method of the present invention.

Using the result of the above calculation, the cost of a particular printing project can be determined prior to printing. The method of determining the printing cost is set forth in the flow diagram illustrated in FIG. 9. First, the cost is estimated by multiplying the cost of each of the constituents in the ink solution by the percent of each constituent used. This is depicted in step 150 of FIG. 9. Then, these products are summed. This is depicted in step 152 of FIG. 9. That sum is then multiplied by the amount of ink solution used. This is depicted in step 154 of FIG. 9. The result of the cost calculation gives a number that is proportional to the cost of the job. The cost calculation can be easily performed by use of the following equation:

$$\text{cost of job}=(\text{ink solution used})\cdot\Sigma(\text{cost of constituent})\cdot(\text{\% of constituent})$$

In still another embodiment of this invention, the cell volume calculation is used to determine which of several cell geometries that yield the same cell volume is the best one to use. A wide variety of cell geometries can produce the same cell volume per unit area in the shadow and highlight cells. From a print quality standpoint, it is desirable to minimize the cell wall width, thereby maximizing the engraved area which should in turn produce the most uniform ink spreading when the ink comes into contact with the paper during printing. Minimizing the cell walls avoids the grainy look associated with visible printed "dots." Another aspect of cell geometry is the presence or absence of channels and their size. A moderately larger channel is easier to measure and thus easier to replicate on future cylinders than where there is a very small channel or no channel at all. However, large channels can lead to ink being dragged out of the cells thus smearing the ink, which is especially noticeable on printed type. Cell geometry can also effect the cell volume per unit area at digital values other than the highlight or shadow digital values. Thus, it may be desirable to select a cell geometry which will match not only the highlight and shadow cell volume per unit area, but also the cell volume per unit area in the midtones. The "best" cell geometry is therefore a function of priorities and experience.

The following method determines a cell geometry that matches the cell volume per unit area at the highlight and shadow points and creates a cell wall as close to a user specified minimum as possible. It is apparent, however, that other aspects of cell geometry, such as channel width, midtone cell volume per unit area, etc., could be optimized using the cell volume calculation of the present invention and essentially the same iterative technique as disclosed below.

Figure 10A:
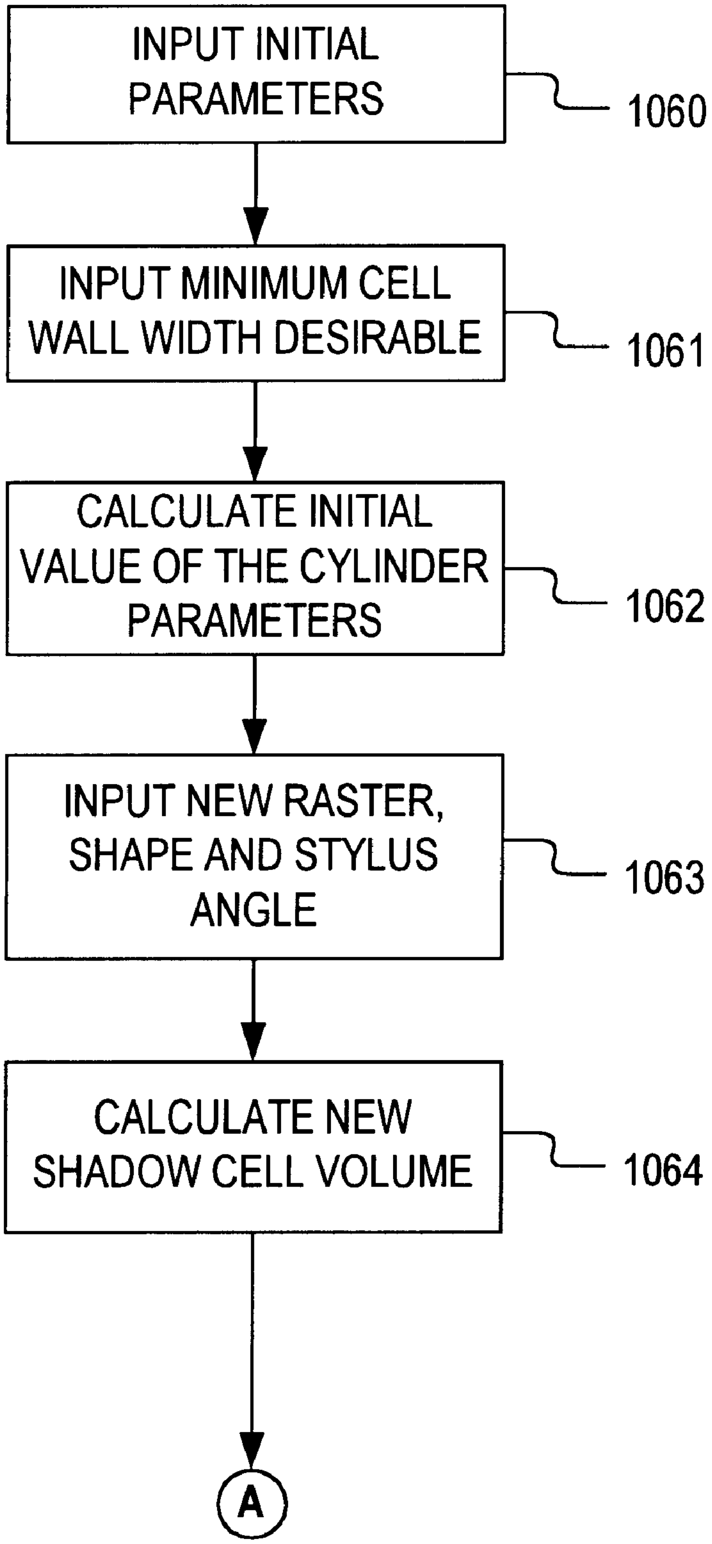
FIGS. 10A and 10B are a flow diagram of the steps taken in accordance with another method of the present invention.
Figure 10B:
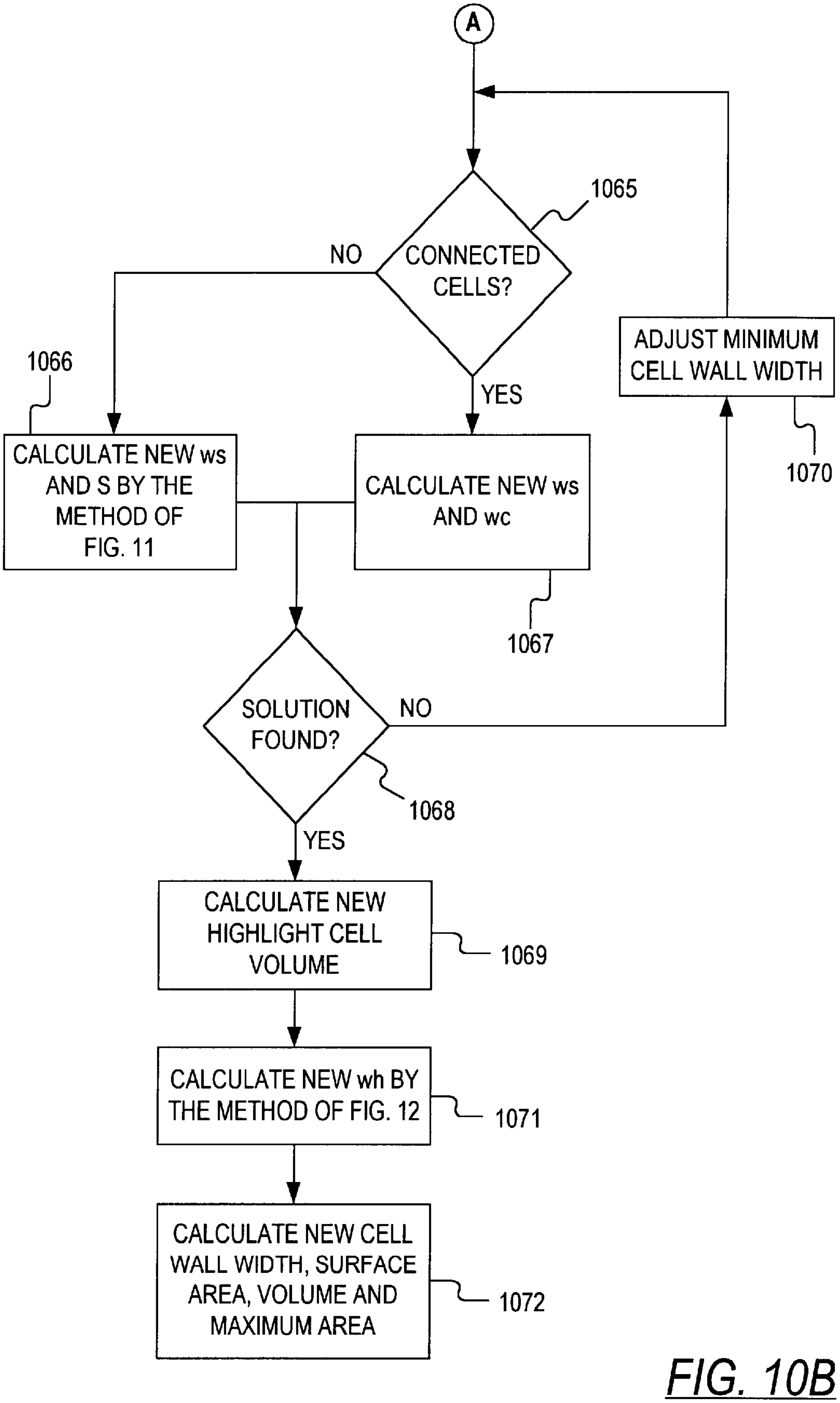

The method of determining the optimal cell geometry is set forth in the flow diagram illustrated in FIGS. 10A and 10B. The method begins by first inputting several parameters including the initial highlight cell width (wh), the initial shadow cell width (ws), (the initial channel width (wc) or space (S)), the initial stylus angle, the initial highlight digital value (dvh), and the initial shadow digital value (dvs). This is depicted in step 1060 of FIG. 10A. A zero inputted for S indicates that the shadow cells are connected cells and hence have no space. Similarly, a zero inputted for we indicates that the shadow cells are discrete and hence have no channel width. Next, the minimum cell wall width desirable is inputted. This is depicted in step 1061 of FIG. 10A. Then, the initial value of the cylinder parameters is calculated, these parameters include the shadow cell wall width, the cell surface area, and the cell volume per unit area. This is depicted in step 1062 of FIG. 10A. Next, the new raster, cell shape and stylus angle are inputted. This is depicted in step 1063 of FIG. 10A. The new shadow cell volume is then calculated. This is depicted in step 1064 of FIG. 10A. In the case of connected cells, the new value of ws and wc is then calculated. This is depicted in steps 1065 and 1067 of FIG. 10B. In the case of discrete cells, the new value of ws and S is then calculated by the iterative method of FIG. 11. This is generally depicted in steps 1065 and 1066 of FIG. 10B. If no solution is found, then the minimum cell wall width is adjusted, this is depicted in step 1070, and steps 1065–1068 are repeated until a solution is found. Then, the new highlight cell volume is calculated. This is depicted in step 1069 of FIG. 10B. The new wh is then calculated by the iterative method of FIG. 12. This is generally depicted in step 1071 of FIG. 10B. The new cell wall width, the new cell surface area, the new cell volume and the new maximum cell area are then calculated. This is depicted in step 1072 of FIG. 10B.

Figure 11:
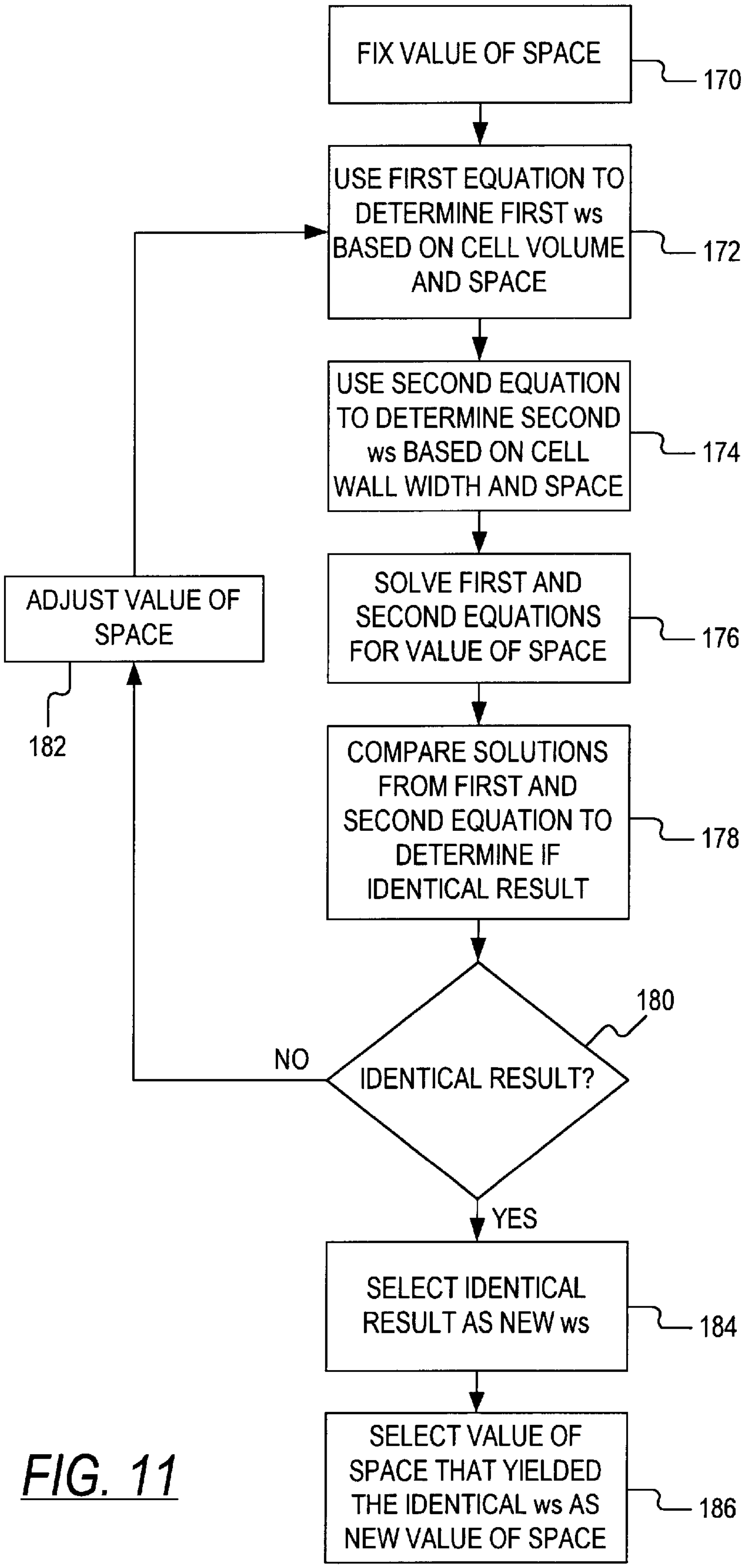
FIG. 11 is a flow diagram of the steps taken in accordance with a further method of the present invention.

The new value of ws and S is calculated by the iterative method set forth in the flow diagram illustrated in FIG. 11. The method begins by fixing the value of the space (S). This is depicted in step 170 of FIG. 11. The method proceeds by using a first equation for determining a first shadow cell width (ws) based on the desired shadow cell volume and a space having a variable value. This is depicted in step 172 of FIG. 11. Next, a second equation is used for determining a second shadow cell width (ws) based on a fixed cell wall width and the space. This is depicted in step 174 of FIG. 11. The value of the space is then used to solve the first equation and the second equation, i.e., the value of the space is used to compute a result from each of the equations. This is depicted in step 176 of FIG. 11. Next, the solutions from both the first equation and the second equation are compared to determine whether the first equation and the second equation produced an identical result. This is depicted in step 178 of FIG. 11. If an identical result was produced, the identical result is selected as the new value of the shadow cell width. This is depicted in steps 180 and 184 of FIG. 11. Otherwise, the value of the space is adjusted and steps 172–180 are repeated in an iterative fashion until an identical result is produced. This is depicted in steps 180, 182, 172–178 of FIG. 11. The new value of the space is determined by selecting as the new value of the space the value of the space that produced the identical ws. This is depicted in step 186 of FIG. 11.

Next, the new highlight cell volume is calculated from the initial highlight cell volume, raster, cell shape and stylus angle to achieve the same cell volume per unit area at the new raster, cell shape and stylus angle by use of the following formula:

$$V_{new}=V_{initial}(dl\cdot dq/(dl_{initial}\cdot dq_{initial}))$$

Figure 12:
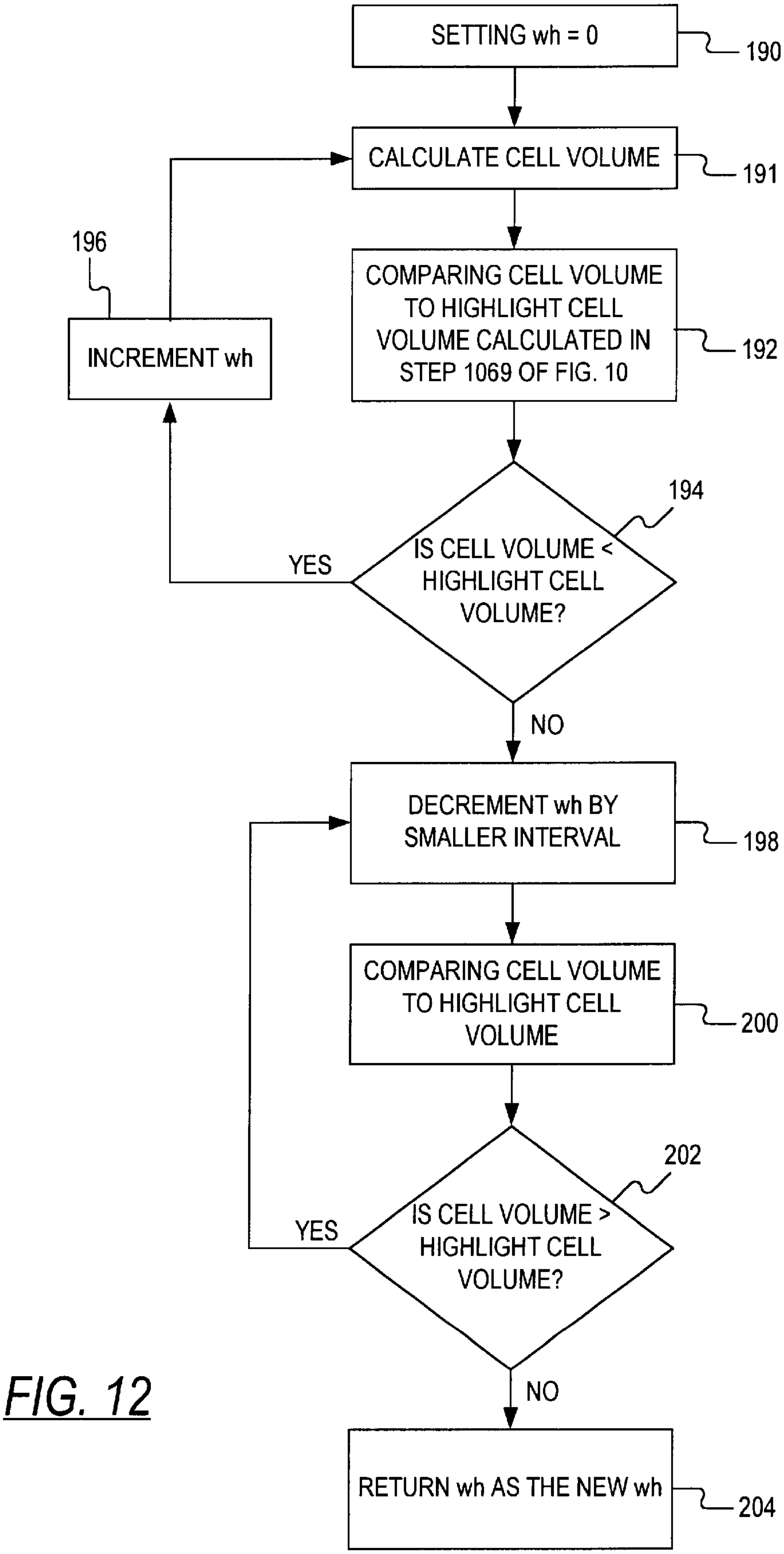
FIG. 12 is a flow diagram of the steps taken in accordance with still another method of the present invention.

The new wh is calculated by the iterative method set forth in the flow diagram illustrated in FIG. 12. The method begins by first setting wh to zero. This is depicted in step 190 of FIG. 12. Next, a cell volume is calculated with the set value of wh. This is depicted in step 191 of FIG. 12. Then, the new highlight cell volume from the above equation is compared with the cell volume. This is depicted in step 192 of FIG. 12. If the cell volume is less then the highlight cell volume, wh is incremented, the cell volume at the incremented value of wh is calculated, and the cell volume is compared to the highlight cell volume at the incremented wh. This is depicted in steps 194, 196, 191 and 192 of FIG. 12. The value of wh is decremented by an interval smaller than the increment in order to find a closer approximation of a new value of wh. This is depicted in step 198 of FIG. 12. Next, the cell volume at the decremented value of wh is compared to the highlight cell volume. This is depicted in step 200 of FIG. 12. If the cell volume is greater than the highlight cell volume, then wh is decremented by the smaller interval and steps 198–202 are repeated until the cell volume is less than or equal to the highlight cell volume. This is depicted in steps 202, and 198–202 of FIG. 12. Then wh is returned as the new wh. This is depicted in steps 204 of FIG. 12.

The values for ws and wc from step 1067 in FIG. 10B are determined from the following equations:

$$\text{new shadow cell width } (ws)=(4\cdot dq-8\cdot scp+2^{5/2}\cdot(\text{val})^{0.5}/(dl)^{0.5})/8$$

where dq is the new maximum cell width;

dl is the new stylus period;

sep is the new cell wall width;

$\text{val}=(-dl\cdot dq^2)+4\cdot dl\cdot dq\cdot seq-4\cdot dl\cdot sep^2+16\cdot vol\cdot\tan(alpha/2)$;

alpha=(the stylus angle)·n/180; and vol is the new cell volume.

$$\text{new channel width } (wc)=(4\cdot dq-8\cdot sep-2^{5/2}\cdot(\text{val})^{0.5}/(dl)^{0.5})/8$$

where dq, dl, seq, val, alpha, and vol are the same as they were for the new value of the shadow cell width above.

One of the initial parameters calculated in step 1062 of FIG. 10A is the initial cell wall width which is calculated by:

using the following equation to determine a first cell wall width:

$$\text{cell wall width}=dq-(dvh\cdot ws-dvs\cdot wh)/(dvh-dvs)$$

using the following equation to determine a second cell wall width:

$$\text{cell wall width}=dq/2-(-(dvs(wh-ws)/(dvh-dvs))+(wc+ws\cdot\cos(S\cdot n/dl))/(1+\cos(S\cdot n/dl)))$$

selecting as the initial value of the cell wall width the lesser of the first cell wall width and the second cell wall width.

where dv, dl, S, dvh, dvs, wh, and ws are the same as they were for the initial value of the cell wall width above; and dq is the initial maximum cell width.

$$\text{new cell volume}-2\cdot\cot(\text{alpha}/2)\cdot((A^2+2\cdot C^2+4\cdot B\cdot C\cdot dv+2\cdot B^2\cdot dv^2)\cdot xend/2+A\cdot dl(C+B\cdot dv)\cdot\sin(2\cdot n\cdot xend/dl)/n+A^2\cdot dl\cdot\sin(4\cdot n\cdot xend/dl)/(8\cdot n))$$

where A, B, C, dl, dv, alpha and xend are the same as they were for the cell volume calculation above.

While the present invention has been described with reference to one or more preferred embodiments, those skilled in the art will recognize that many changes may be made thereto without departing from the spirit and scope of the present invention which is set forth in the following claims.

What is claimed is:

1. A method of calculating a set of engraving parameters for a gravure cylinder at a new ink cut, the method comprising the steps of:

(a) inputting an initial ink cut and a target ink cut;

(b) calculating an initial cell volume at said initial ink cut;

(c) calculating a target cell volume at said target ink cut; and (d) calculating a set of engraving parameters at said target ink cut from said target cell volume by an iterative method wherein said parameters include a new shadow cell width and a new cell wall width, wherein said step (d) further comprises the steps of:

(i) setting a test shadow cell width to a set value;

(ii) calculating a dummy volume from said test shadow cell width;

(iii) comparing said dummy volume with said calculated target cell volume from step (c);

(iv) selecting said test shadow cell width as said new shadow cell width if said dummy volume is equal to said calculated target cell volume, otherwise;

(v) adjusting said new shadow cell width; and (vi) repeating steps (ii)–(vi) until said dummy volume equals said calculated target cell volume.

2. The method of claim 1 further comprising the step of:

calculating an 8 bit tone curve at said target ink cut from said target cell volume.

3. The method of claim 1 wherein said step (ii) further comprises the step of using the following equation to determine said dummy volume:

$$\text{dummy volume}=2\cdot\cot(\text{alpha}/2)\cdot((A^2+2\cdot C^2+4\cdot B\cdot C\cdot dv+2\cdot B^2\cdot dv^2)\cdot xend/2+A\cdot dl(C+B\cdot dv)\cdot\sin(2\cdot n\cdot xend/dl)/n+A^2\cdot dl\cdot\sin(4\cdot n\cdot xend/dl)/(8\cdot n)),$$ wherein:

$A=(-wc+ws)/(2)(1+\cos(S\cdot n/dl)))$;

$B=(wh-ws)/(2(dvh-dvs))$;

$C=(-(dvs(wh-ws)/(dvh-dvs))+(wc+ws\cdot\cos(S\cdot n/dl))/(1+\cos(S\cdot n/dl)))/2$;

wh is a desired highlight cell width;

ws is a desired shadow cell width;

wc is a desired channel width between connected cells;

S is a desired space between discrete cells;

dl is determined from an initial raster and an initial cell shape;

dvh is a digital value used to engrave highlight cells;

dvs is a digital value used to engrave shadow cells;

dv is a digital value selected from the set consisting of dvh, dvs and dvm where dvh is selected if a highlight cell volume is being calculated, dvs is selected if a shadow cell volume is being calculated, and dvm is selected if a midtone cell volume is being calculated;

alpha=(a desired stylus angle in degrees)·n/180; and xend is selected from the set consisting of [dl/2 and $dl\cdot\arccos((-C-B\cdot dv)/A)/(2n)$] where dl/2 is selected if there is a channel, and $dl\cdot\arccos((-C-B\cdot dv)/A)/(2n)$ is selected if there is not a channel.

* * * * *